United States Patent [19]

Battaglia et al.

[11] Patent Number: 4,647,425

[45] Date of Patent: Mar. 3, 1987

[54] METHOD OF VACUUM DEGASSING AND REFILLING A REACTOR COOLANT SYSTEM

[75] Inventors: Joseph A. Battaglia, Forest Hills; Robert W. Fleming, Monroeville, both of Pa.

[73] Assignee: Westinghouse Electric Corp., Pittsburgh, Pa.

[21] Appl. No.: 575,130

[22] Filed: Jan. 30, 1984

[51] Int. Cl.$^4$ .............................................. G21C 19/32
[52] U.S. Cl. ..................................... 376/308; 376/310
[58] Field of Search ............... 376/214, 256, 308, 310, 376/298, 299

[56] References Cited

U.S. PATENT DOCUMENTS

| | | | |
|---|---|---|---|
| 3,210,912 | 10/1965 | Peake et al. ............................. | 55/39 |
| 3,222,255 | 12/1965 | Maldague ............................ | 376/310 |
| 3,480,515 | 11/1969 | Goeldner ............................ | 376/310 |
| 3,932,212 | 1/1976 | Gross et al. .......................... | 376/308 |
| 3,964,965 | 6/1976 | Kausz et al. .......................... | 376/310 |
| 4,043,865 | 8/1977 | Kausz et al. .......................... | 376/310 |
| 4,104,117 | 8/1978 | Parziale et al. ...................... | 376/214 |
| 4,123,324 | 10/1978 | Sanada et al. ........................ | 376/298 |
| 4,187,146 | 2/1980 | Shen et al. ........................... | 376/310 |
| 4,293,382 | 10/1981 | Ohsumi et al. ...................... | 376/308 |
| 4,322,267 | 3/1982 | Kinoshita et al. .................... | 376/299 |
| 4,533,514 | 8/1985 | Yamamoto et al. ................. | 376/308 |

FOREIGN PATENT DOCUMENTS

| | | | |
|---|---|---|---|
| 0130227 | 9/1985 | European Pat. Off. ............ | 376/214 |
| 1577170 | 6/1969 | France ................................ | 376/214 |

Primary Examiner—Salvatore Cangialosi
Attorney, Agent, or Firm—Daniel C. Abeles

[57] ABSTRACT

A procedure for vacuum degassing of a reactor coolant system which basically utilizes existing equipment to degas and refill the coolant system. The level of radiogas and non-radiogas concentration is reduced to low residual levels in less than two hours to expedite shutdown operations. The procedure enhances residual heat removal by using the steam generators as reflux condensers. During draindown of the reactor coolant to the midplane of the reactor vessel outlet nozzles, a two-phase pump is used and a vacuum is established in the vapor space created in the reactor pressure vessel, and the steam generators.

30 Claims, 1 Drawing Figure

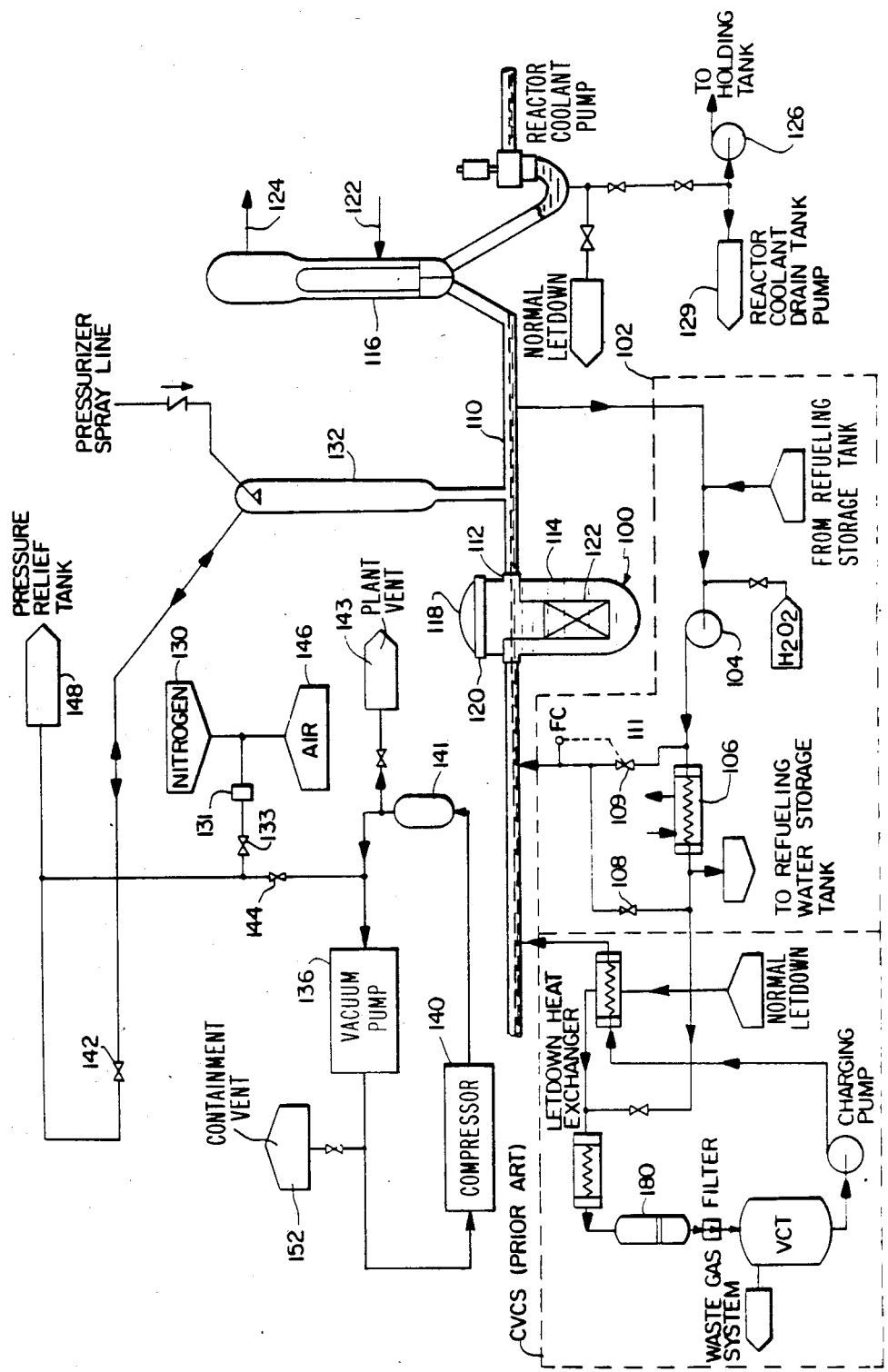

METHOD OF VACUUM DEGASSING AND REFILLING A REACTOR COOLANT SYSTEM

BACKGROUND OF THE INVENTION

1. Field of the Invention:

The present invention relates to a process for vacuum degassing and refilling a reactor coolant system and more particularly to a method for reducing radiogas and non-radiogas concentrations in reactor coolant to low residual levels—radiogas referring to the radioactive gas in the reactor system.

2. Background of the Invention:

During pressurized water reactor (PWR) plant shutdowns, it is a common practice to draindown the reactor coolant system past the reactor vessel flange to the midplane of the reactor vessel nozzles. That midplane coincides with the midplane of the connecting "hot leg" piping leading to the steam generators. This draindown permits inspection, testing and maintenance, during shutdown, of pumps, steam generators, support structure and the like.

During reactor operation, some fission gasses (radiogas) created by fission reactions in the nuclear fuel, will enter the reactor coolant system (RCS) and become dissolved in the reactor coolant. Subsequent to shutdown but before refueling and maintenance operations commence, the radiogas concentration must be reduced to avoid excessive radiation exposure to plant maintenance and inspection personnel.

Reactor coolant has previously been degassed using a volume control tank (VCT) connected to the RCS. As used herein the RCS primarily includes such nuclear steam supply system (NSSS) components as the reactor vessel, the steam generators, the reactor coolant pumps and the connecting pipes. The VCT is part of a system known as the chemical and volume control system (CVCS) which operates in the degassing mode by flashing radiogas out of the reactor coolant and into the vapor space of the VCT. An example of such a system is illustrated in the accompanying Figure.

Typically, a relatively small flow of reactor coolant is diverted from the RCS and through the CVCS. This stream is first cooled in a letdown heat exchanger to prevent steam from forming when the reactor coolant is subsequently depressurized. The stream is then purified in a mixed bed demineralizer and filtered to remove dissolved ionic or suspended particulate material and passed to the VCT. In the VCT the stream is subjected to a spraying action to remove any dissolved radiogas from solution. The radiogas then collects in the vapor space of the VCT as free gas and is purged to a waste gas system for further processing. Finally the degassed reactor coolant is returned to the RCS with a high pressure charging pump which dilutes the remaining reactor coolant with respect to radiogas. This process is continued until the radiogas concentration of the reactor coolant is compatible with shutdown operations. This method of degassing is undesirably time consuming requiring up to two days for accomplishing the degassing operation.

This degassing method also involves an intricate start-up procedure including filling, venting and jogging the reactor coolant pumps multiple times until the coolant level in the pressure vessel is restored to its normal operating level. This is due to the need to continuously vent the pressure vessel as the coolant level is increased so as to prevent undesired gases from being forced into solution with the coolant water and to avoid pumping in two phases through the reactor coolant pumps.

An improvement over this CVCS procedure is a vacuum degassing system in which a reactor coolant system is drained approximately to the middle of a hot leg connecting the pressure vessel to the steam generator. This draining is typically accomplished over a slight nitrogen pressure, introduced through a pressurizer, to avoid introducing air and therefore oxygen into the system. A reactor coolant draindown pump as illustrated in the accompanying Figure is generally used for this purpose. After the coolant level is lowered to the midplane of the hot leg nozzle, a vacuum is drawn on the system by removing the nitrogen until the cooling system saturation pressure is reached. This results in boiling of the reactor coolant left in the system causing it to degas. After degassing, refueling and maintenance operations are preformed.

Prior to start-up, the vacuum system is used to refill the reactor coolant system under vacuum, thus eliminating the need for the fill-vent-jog cycle of the reactor coolant pumps as described above. This simplified refill procedure is possible as a result of the presence of a vacuum in the system which permits the reactor coolant level to raise without trapping a significant gas bubble in the vapor space. Therefore, there is no need to periodically vent the reactor vessel during refilling.

Shen et al, in U.S. Pat. No. 4,187,146 discloses a method and apparatus for reducing radioactive emissions from a nuclear reactor plant which result from leakages of reactor coolant into the secondary liquid in steam generators. One aspect of the invention relates to condensing and decontaminating blowdown tank vapors instead of venting then to the atmosphere.

Kausz et al, in U.S. Pat. No. 4,043,865 discloses a PWR coolant treatment system which controls the boron content of the coolant and degasses the coolant during reactor operation. Boron control is effected in a rectification column and degasification is periodically effected as required by a conventional degasifier.

Gross et al, in U.S. Pat. No. 3,932,212 discloses a method and apparatus for depressurizing and degassing the condensates of boiling water reactors (BWR). Secondary condensate (from a feedwater preheater) is directed to a relatively high pressure, high temperature chamber and then fed into the primary condensate flow (from the main condenser) whereby the secondary condensate vaporizes in the primary condensate to degas the primary condensate.

Kausz et al, in U.S. Pat. No. 3,964,965 discloses a conventional PWR coolant radiogas disposal system which utilizes a conventional degasser and a separator for separating noble gases which can then be stored.

Goeldner, in U.S. Pat. No. 3,480,515 discloses a system for the concentration of radioactive materials from reactor coolant. The system disclosed is basically a vapor compression still system.

Peake et al, in U.S. Pat. No. 3,210,912 discloses a method and apparatus for removing highly soluble gases such as ammonia from a liquid such as steam generator feedwater. Other non-reactor degassers are disclosed in U.S. Pat. No. 3,342,020 to Ross.

Maldague, in U.S. Pat. No. 3,222,255 discloses a method for purifying reactor coolant during reactor operation by separating a small stream of reactor coolant from the RCS and distilling the stream at a pressure substantially the same as the reactor operating pressure to form a vapor of primary fluid and a liquid residue. The vapor is returned to the RCS and the residue discarded.

None to the prior art discloses a simple, fast and effective method for degassing reactor coolant after reactor shutdown and which makes use of many existing NSSS components.

SUMMARY OF THE INVENTION

It is therefore a primary object of the present invention to provide a simple and fast method for degassing and refilling an RCS.

It is a further object of the present invention to provide a vacuum degassing procedure which will safely reduce the radiogas and non-radiogas concentration in the reactor coolant to low residual levels in a short period of time.

It is a still further object of the present invention to provide a vacuum degassing procedure which utilizes existing reactor equipment and which also enhances residual heat removal (RHR).

It is a further object of the present invention to provide a reactor coolant refill procedure which is rapid and which minimizes the need for oxygen scavenging chemicals such as hydrazine to be added to the reactor coolant during refill operations to remove dissolved oxygen.

To achieve the foregoing and other objects and in accordance with the purpose of the present invention, as embodied and broadly described herein, the invention may comprise a method for vacuum degassing a reactor coolant system having reactor coolant in a reactor pressure vessel connected to at least one steam generator by a hot leg. The method comprises draining down the reactor coolant system to approximately the midpoint of the hot leg and maintaining the reactor coolant system in an unvented condition during the draindown operation. Any flashed reactor coolant in the primary side of the steam generator is then refluxed. As used herein, flashed reactor coolant means liquid coolant which flashes into the steam phase as a result of lowered ambient pressure. The bulk of the reactor coolant as well as the refluxed reactor coolant is circulated through a residual heat removal system to cool the reactor coolant. A vacuum is drawn on the reactor coolant system to evacuate any gas stripped from the reactor coolant.

Preferably, the step of draining the coolant system further comprises using a two phase pump to establish a partial vacuum in the unvented reactor coolant system during draindown. The partial vacuum should be sufficient to cause the reactor coolant to boil at the prevailing temperatures in the reactor coolant system whereby degassing occurs during the draindown step.

Preferably, the step of refluxed comprises flowing a secondary coolant through a secondary side of the steam generator so that any flashed reactor coolant in the primary side of the steam generator is condensed back into a liquid and any non-condensible gases may be stripped away by the vacuum system. Preferably, the heat removal system used utilizes preexisting heat removal equipment located in the secondary or steam side of the plant.

Preferably, the step of drawing a vacuum is performed simultaneous to draining down the reactor coolant system and after the heat removal step is operating.

The step of drawing a vacuum may be performed utilizing an existing reactor waste gas removal system or may involve the use of a dedicated waste gas system.

It is also preferred that the circulating reactor coolant in the residual heat removal system be sampled and that the vacuum be maintained until a predetermined level of gas concentration is detected during said sampling. After the proper level of gas concentration is detected, the vacuum is preferably broken by admitting air into the circulating system. The oxygen in the air dissolves in the reactor coolant, thus facilitating the solubilization of radioactive material that may subsequently be removed by ion-exchange in a CVCS demineralizer. Removal of the radioactive material at this point by deliberate aeration advantageously prevents later delays in operations should aeration occur in an uncontrolled manner.

Preferably, when the vacuum is broken and the steam generators cease operation as reflux condensers, the circulation through the residual heat removal pump is increased in order to support the increased heat load.

It is also preferred that after degassing, the reactor coolant system be refilled under vacuum conditions to eliminate the time consuming operation of jogging the reactor coolant pumps and venting the reactor coolant system multiple times. Vacuum refilling has the additional significant advantage in that the amount of oxygen which must be removed by the addition of hydrazine to the coolant is reduced thereby requiring less hydrazine, saving time and cost.

BRIEF DESCRIPTION OF THE DRAWING

The accompanying FIGURE, which is incorporated in and forms a part of the specification, illustrates a reactor coolant vacuum degasification system, which, together with the description, serves to explain the principles of the invention.

DETAILED DESCRIPTION OF THE INVENTION

Reference will now be made in detail to the presently preferred embodiment of the invention, with reference to the accompanying Figure.

After shutdown of a reactor 100 for maintenance, refueling, or the like the coolant is usually borated to refueling conditions. The RCS is then cooled down using an RHR system 102 which typically comprises a RHR pump 104, a RHR heat exchanger 106 and control valves 108 and 109. The RHR system 102 is connected between a "hot leg" 110 of the RCS which connects the outlet nozzle 112 of the reactor vessel 114 to a steam generator 116. In the Figure, the numeral 118 indicates the reactor vessel head and numeral 120 the reactor vessel flange. The RHR system is an auxiliary cooling system used to cool down the reactor if the main cooling system is isolated as a result of a fault or the like. Since the reactor core 122 continues to generate decay heat for a period of time after shutdown, the RHRS is utilized to take out this residual heat.

In accordance with the present invention, selected steam generator(s) 116 and the RHR system are used during degassing. It should be understood that a typical reactor will have on the order of two to four steam generators associated with it, not all of which are necessarily used during the vacuum degassing and refill method described herein.

The RCS is drained to the middle of the reactor vessel outlet nozzle 112 which coincides with the middle of the hot leg 110. At the same time, cooling water is set to flow through the shell (secondary side) of selected steam generators 116 via cooling water inlet 122 and cooling water outlet 124.

A two-phase pump 126 is used to draindown the RCS to the middle of the hot leg. A two-phase pump 126 is used since, in accordance with the present invention, the RCS is not vented during draindown and will eventually reach saturation conditions resulting in a low available net positive suction head (NPSH). The two-phase pump is required to satisfy the pump suction condition of low pressure. The pump 126 is the only significant structural modification to the existing reactor system necessary in order to practice the present invention. In prior vacuum degassing systems, nitrogen was admitted to the reactor vessel through a nitrogen reservoir via a pressure relief tank. Thus, two-phase pumping was not required and the single, liquid phase reactor coolant would drain by gravity to the reactor coolant drain tank pump 129 to draindown the RCS.

As the RCS is drained, the RHR flow is throttled as necessary using valves 108 and 109 to prevent cavitation of the RHR pump 104. The valve 109 is operated by a flow controller FC to bypass the RHR heat exchanger through bypass line 111 whenever the outlet flow rate falls below a predetermined value.

Since according to the present invention the RCS is not vented during draindown, steam bubbles will be formed in the reactor coolant due to the low pressure saturation condition existing in the RCS. Essentially, using the present method, the reactor coolant boils during draindown as a result of lowering the pressure at the prevailing temperature. This boiling action enhances degassing the reactor coolant. As alluded to above, in prior art vacuum degassing systems, the draindown operation was performed using a single phase pump 129 and over a slight nitrogen pressure, thus avoiding boiling during the draindown.

Because the RHR system is throttled, condensation will occur in the inverted U-tubs 134 of the steam generator 116 whose shell is being cooled by a secondary cooling system 122, 124. This condensed steam will flow back or reflux to the hot leg 110 and be drawn through the RHR system. Thus, the present invention utilizes selected steam generators 116 as reflux condensers to condense steam in the primary side (the side carrying reactor coolant flow) into droplets which form on the inside of the steam generator tubes 134. Thus, using the present invention, both selected steam generators 116 and the RHR heat exchanger 106 are used to cool the reactor coolant and strip away non-condensible gases. As further explained below, the steam generators 116 continue to function as reflux condensers until the vacuum on the RCS is broken thus causing coolant boiling to stop.

Radiogas, hydrogen and other gases stripped from the reactor coolant are removed as non-condensibles by the vacuum pump 136 and gas removal system, generally 138, via the pressurizer tank 132.

In accordance with a preferred embodiment of the present method, after the reactor coolant level has been drained to the middle of the hot leg 110 and the RHR stabilized, the pressurizer tank 132 is drained and the vacuum pump 136 started. Preferably, the vacuum pump is of the water ring type where water is used as a pump sealant and capable of handling steam. After a vacuum is established in the pressurizer tank 132 due to the draindown, relief valve 142 is opened and the non-condensibles, as well as any steam in the RCS, are drawn by the vacuum pump 126 into a gas removal system which may comprise either the existing waste gas removal system including a gas compressor 140 and evacuated gas delay tanks 141 or a dedicated waste gas removal system specifically designed to accommodate any oxygen present in the gas handling portion of the system. After a suitable storage period the evacuated gases may be vented through a vent 143. Vacuum induced gas flow continues until an RHR system sample indicates acceptable radiogas and hydrogen concentration. In a typical reactor, the vacuum degassing operation, when performed according to the present invention, can be accomplished in approximately two hours or less depending upon the design of the vacuum system.

After establishing the proper radiogas and hydrogen concentration in the coolant, the vacuum pump 136 is stopped and isolated from the RCS by means of isolation valve 144. Air is admitted into the vacuum system from the air reservoir 146 via a filter 131 and valve 133. This breaks the vacuum and instantly aerates the circulating reactor coolant. The oxygen in the air dissolves in the reactor coolant thus facilitating the solubilization of radioactive material that may subsequently be removed by ion-exchange in a CVCS demineralizer or the like. Both air and hydrogen peroxide are sources of oxygen and either can be used to oxygenate the coolant. It should be appreciated that hydrogen peroxide is a difficult chemical to handle and the sudden inrush of air caused by the breaking of the vacuum is a preferred way to oxygenate the reactor coolant. Purification for solubilized radioactive material removal may be achieved by using a mixed bed demineralizer 180 via feed and bleed through the low pressure purification system of the CVCS. Since condensing stops in the steam generators 116 when the vacuum is broken, RHR flow is increased to satisfy the additional heat load. When adequate purification is achieved, the pressure vessel head 118 is removed and the reactor vessel and refueling cavity is flooded and refueling or other shutdown operations may commence.

At the end of the shutdown operations, such as refueling, and after the reactor vessel head 118 is resecured, the vessel is again drained down to the nozzle midplane and the vacuum system is again used to evacuate the vapor space and refill the RCS. Air is evacuated from the steam generator tubes and the vapor space in the reactor vessel using the vacuum pump 136. The system is then refilled under vacuum. The air suctioned off during this evacuation may be vented through the containment vent 152 since it will contain no radiogas. This eliminates the very time consuming operation of jogging the reactor coolant pumps and venting the system multiple times. Importantly, the amount of oxygen previously required to be removed by addition of hydrazine during this operation is also reduced. Air which was previously trapped in the steam generator tubes during the system refill operation and literally squeezed into solution during the prior art jog-vent-fill cycle of refilling is now removed by the evacuation process and therefore very little free oxygen is dissolved in the coolant for removal by hydrazine. Thus, not only is the hydrazine/oxygen reaction time reduced, but also much less hydrazine is required. In this regard it should be appreciated that the jog-fill-vent cycle of the reactor coolant pumps and the removal of oxygen using the hydrazine/oxygen reaction is a very time consuming operation.

When refill is completed, the reactor coolant pumps are started once and remain running. Startup then proceeds as normal and the reactor coolant vacuum degassing and refill system is secured.

It is important to appreciate that with the method of the present application, the RCS is not vented as it is being drained down by the two-phase pump 126. In accordance with the present method, no nitrogen gas or the like will be introduced into the RCS. This results in degassing during draindown since as the reactor coolant level is lowered, a vacuum is created in the RCS which results in reactor coolant boiling at the prevailing relatively low temperature. In addition, the present method utilizes selected steam generators as reflux condensers by flowing cooling water through the secondary or shell side of the steam generator causing the steam in the primary or reactor coolant side to condense as liquid droplets and reflux back into the bulk of reactor coolant which is flowing through the RHR system.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for vacuum degassing a pressurized water reactor coolant system (RCS) having reactor coolant containing radiogas and nonradiogas and a reactor pressure vessel connected to at least one steam generator by a hot leg, comprising:
   draining down the RCS to approximately the midpoint of said hot leg;
   maintaining the RCS in an unvented condition during said step of draining down;
   refluxing any flashed reactor coolant in a primary side of said at least one steam generator;
   circulating the reactor coolant through a heat removal system;
   drawing a vacuum on said RCS to evacuate at least some of said radiogas and nonradiogas therefrom.

2. The vacuum degassing method of claim 1, wherein said step of draining further comprises using a two-phase pump to establish a partial vacuum in said unvented RCS during draindown, said partial vacuum being sufficient to cause said reactor coolant to boil at prevailing temperatures in said RCS whereby degassing occurs during said draindown step.

3. The vacuum degassing method of claim 1, wherein said step of refluxing further comprises flowing secondary coolant through a secondary side of said at least one steam generator whereby any flashed reactor coolant in said primary side is condensed back into liquid and any non-condensible gases are stripped away.

4. The vacuum degassing method of claim 2, wherein said step of refluxing further comprises flowing secondary coolant through a secondary side of said at least one steam generator whereby any flashed reactor coolant in said primary side is condensed back into liquid and any non-condensible gases are stripped away.

5. The vacuum degassing method of claim 2, wherein said heat removal system is a residual heat removal system.

6. The vacuum degassing method of claim 5, wherein the step of drawing a vacuum is performed after the of draining down and after the heat removal system is operating.

7. The vacuum degassing method of claim 6, wherein the step of drawing a vacuum is performed using a waste gas removal system.

8. The vacuum degassing method of claim 6 further including the step of sampling the circulating reactor coolant in the heat removal system and continuing said drawing step until a predetermined level of gas concentration is detected during said sampling.

9. The vacuum degassing of claim 8 further including the steps of stopping said drawing step after detecting said predetermined level of gas concentration and then breaking said vacuum.

10. The vacuum degassing method of claim 9, wherein the step of breaking said vacuum comprises admitting air to the circulating reactor coolant.

11. The vacuum degassing method of claim 10 further including the step of purifying the circulating reactor coolant in a purification system.

12. The vacuum degassing method of claim 11, wherein the reactor coolant is purified in a mixed bed demineralizer.

13. The vacuum degassing method of claim 11, wherein the step of refluxing is stopped when the vacuum is broken.

14. The vacuum degassing method of claim 13, wherein the step of circulating further comprising increasing the circulation of reactor coolant through the residual heat removal system when the step of refluxing is stopped.

15. The vacuum degassing method of claim 9 further including the step of flooding the reactor after the step of breaking the vacuum.

16. The vacuum degassing method of claim 11 further including the step of flooding the reactor pressure vessel after the step of breaking the vacuum.

17. The vacuum degassing method of claim 16 further including the step of refilling the RCS under vacuum.

18. A method for vacuum degassing a pressurized water reactor coolant system (RCS) having reactor coolant containing radiogas and nonradiogas and a reactor pressure vessel connected to at least one steam generator by a hot leg, comprising:
   draining down the RCS to approximately the midpoint of said hot leg;
   maintaining the RCS in an unvented condition during said step of draining down;
   circulating the reactor coolant through a heat removal system;
   drawing a vacuum on said RCS to evacuate at least some of said radiogas and nonradiogas therefrom.

19. The vacuum degassing method of claim 18, wherein said step of draining further comprises using a two-phase pump to establish a partial vacuum in said unvented RCS during draindown, said partial vacuum being sufficient to cause said reactor coolant to boil at prevailing temperatures in said RCS whereby degassing occurs during said draindown step.

20. The vacuum degassing method of claim 19, wherein said heat removal system is a residual heat removal system.

21. A method for vacuum degassing a pressurized water reactor coolant system (RCS) having reactor coolant containing radiogas and nonradiogas and a reactor pressure vessel connected to at least one steam generator by a hot leg, comprising:
  draining down the RCS to approximately the midpoint of said hot leg;
  drawing a vacuum on said RCS;
  refluxing any flashed reactor coolant in a primary side of said at least one steam generator;
  circulating the reactor coolant through a heat removal system;
  maintaining a vacuum on said RCS to evacuate at least some of said radiogas and nonradiogas therefrom.

22. The vacuum degassing method of claim 21, wherein said step of refluxing further comprises flowing secondary coolant through a secondary side of said at least one steam generator whereby any flashed reactor coolant in said primary side is condensed back into liquid and any non-condensible gases are stripped away.

23. The vacuum degassing method of claim 21, wherein said heat removal system is a residual heat removal system.

24. The vacuum degassing method of claim 23, wherein the step of maintaining a vacuum is performed after the draindown system and after the heat removal step is operating.

25. The vacuum degassing method of claim 24, wherein the step of maintaining a vacuum is performed using a waste gas removal system.

26. The vacuum degassing method of claim 24 further including the step of sampling the circulating reactor coolant in the heat removal system and continuing said maintaining a vacuum step until a predetermined level of gas concentration is detected during said sampling.

27. The vacuum degassing method of claim 26 further including the steps of stopping said maintaining a vacuum after detecting said step of predetermined level of gas concentration and then breaking said vacuum.

28. The vacuum degassing method of claim 27, wherein the step of breaking said vacuum comprises admitting air to the circulating reactor coolant.

29. The vacuum degassing method of claim 27 further including the step of flooding the reactor pressure vessel.

30. The vacuum degassing method of claim 29 further including the step of refilling the RCS under vacuum.

* * * * *